(12) United States Patent
Nerger

(10) Patent No.: US 9,043,289 B2
(45) Date of Patent: May 26, 2015

(54) ESTIMATION OF ERRORS IN ATTRIBUTE VALUES OF AGGREGATED DATABASES

(75) Inventor: Paul Shelton Nerger, San Francisco, CA (US)

(73) Assignee: AFILIAS TECHNOLOGIES LIMITED, Dublin (IE)

( * ) Notice: Subject to any disclaimer, the term of this patent is extended or adjusted under 35 U.S.C. 154(b) by 0 days.

(21) Appl. No.: 13/202,281

(22) PCT Filed: Feb. 18, 2010

(86) PCT No.: PCT/GB2010/000280
§ 371 (c)(1),
(2), (4) Date: Jan. 24, 2012

(87) PCT Pub. No.: WO2010/094914
PCT Pub. Date: Aug. 26, 2010

(65) Prior Publication Data
US 2012/0130960 A1 May 24, 2012

(30) Foreign Application Priority Data
Feb. 18, 2009 (GB) .................................. 0902746.7

(51) Int. Cl.
G06F 17/00 (2006.01)
G06F 17/30 (2006.01)
(52) U.S. Cl.
CPC .... *G06F 17/30536* (2013.01); *G06F 17/30412* (2013.01)
(58) Field of Classification Search
CPC .......... G06F 11/0751; G06F 17/30536; G06F 17/30412

USPC .......................... 707/690, 999.2, 691; 714/48
See application file for complete search history.

(56) References Cited

U.S. PATENT DOCUMENTS 5,251,131 A * 10/1993 Masand et al. .................... 704/9
7,181,471 B1 2/2007 Ibuki et al.
(Continued)

FOREIGN PATENT DOCUMENTS

JP 2007-058885 3/2007
WO WO 2007/115940 10/2007

OTHER PUBLICATIONS

Examination Report for United Kingdom Patent Application No. GB0902746.7, dated Apr. 4, 2012, 4 pages.
"Statement in accordance with the Notice from the European Patent Office dated Oct. 1, 2007 concerning Business Methods," Official Journal of the European Patent Office, Nov. 1, 2007, pp. 592-593.
(Continued)

*Primary Examiner* — Phong Nguyen
(74) *Attorney, Agent, or Firm* — Sheridan Ross P.C.

(57) ABSTRACT

An apparatus (10) comprises a mobile device (1) that communicates with a web server (2) over a mobile network (3). The capabilities of the mobile device (1) can be described by device attributes in a device database. An aggregation engine (5) is provided to compile an aggregated device database from a number of source device databases. Both the source device databases and the aggregated database are stored in a device attribute store (4). When a user of the mobile device (1) attempts to access a web resource hosted on the web server (2), the web server (2) looks up the values of device attributes in the aggregated device database before returning data to the mobile device (1) that is appropriate for its capabilities. The aggregated database includes information regarding the value of each device attribute and also information regarding the probability that this value is correct.

16 Claims, 3 Drawing Sheets

(56) References Cited

U.S. PATENT DOCUMENTS

| | | |
|---|---|---|
| 7,308,436 B2 | 12/2007 | Bala |
| 2003/0139906 A1* | 7/2003 | Barford .................. 702/183 |
| 2006/0201432 A1* | 9/2006 | Pratt .................... 119/51.02 |
| 2007/0239700 A1* | 10/2007 | Ramachandran ............... 707/5 |
| 2008/0256028 A1 | 10/2008 | Kruger et al. |
| 2009/0070237 A1* | 3/2009 | Lew et al. ................. 705/28 |

OTHER PUBLICATIONS

International Search Report for International (PCT) Patent Application No. PCT/GB2010/000280, mailed May 27, 2010, 2 pages.

International Preliminary Report on Patentability for International (PCT) Patent Application No. PCT/GB2010/000280, dated Aug. 23, 2011, 4 pages.

\* cited by examiner

| Pe | 0.050 | | |
|---|---|---|---|
| N Sources | P(OK) | P(DE) | P(UE) |
| 1 | 0.950 | 0.00000 | 0.05000000000000 |
| 2 | 0.903 | 0.09500 | 0.00250000000000 |
| 3 | 0.857 | 0.14250 | 0.00012500000000 |
| 4 | 0.815 | 0.18549 | 0.00000625000000 |
| 5 | 0.774 | 0.22622 | 0.00000031250000 |
| 6 | 0.735 | 0.26491 | 0.00000001562500 |
| 7 | 0.698 | 0.30166 | 0.00000000078125 |
| 8 | 0.663 | 0.33658 | 0.00000000003906 |
| 9 | 0.630 | 0.36975 | 0.00000000000195 |
| 10 | 0.599 | 0.40126 | 0.00000000000010 |

| C(I,j) | 1 | 2 | 3 | 4 | 5 | 6 | 7 | 8 | 9 | 10 |
|---|---|---|---|---|---|---|---|---|---|---|
| 1 | N/A | 0.109 | 0.1402 | 0.0719 | 0.1306 | 0.0864 | 0.1557 | 0.1489 | 0.0676 | 0.2306 |
| 1 | | N/A | 0.1263 | 0.1096 | 0.2094 | 0.1435 | 0.2645 | 0.1148 | 0.0894 | 0.1432 |
| 1 | | | N/A | 0.0658 | 0.0774 | 0.1312 | 0.1447 | 0.114 | 0.0333 | N/A |
| 1 | | | | N/A | 0.0524 | 0.0434 | 0.0635 | 0.0646 | 0.0714 | 0.1053 |
| 1 | | | | | N/A | 0.114 | 0.2397 | 0.0987 | 0.1556 | 0.0187 |
| 1 | | | | | | N/A | 0.1775 | 0.0343 | 0.6828 | 0.0203 |
| 1 | | | | | | | N/A | 0.141 | 0.0862 | 0.0625 |
| 1 | | | | | | | | N/A | 0.2857 | 0.1025 |
| 1 | | | | | | | | | N/A | 0.3333 |
| 1 | | | | | | | | | | N/A |

FIG. 4A

| Source | 1 | 2 | 3 | 4 | 5 | 6 | 7 | 8 | 9 | 10 |
|---|---|---|---|---|---|---|---|---|---|---|
| Estimated Pe | 0.09705256 | 0.12582314 | 0.0923892 | 0.04641255 | 0.05491577 | 0.16560536 | 0.0320287 | 0.11644658 | 0.20221928 | 0.10582511 |
| Pe Rank | 5 | 8 | 4 | 2 | 3 | 9 | 1 | 7 | 10 | 6 |

FIG. 4B

ESTIMATION OF ERRORS IN ATTRIBUTE VALUES OF AGGREGATED DATABASES

FIELD OF THE INVENTION

The present invention relates to a method and apparatus for estimating the probability of error of a value of an attribute in a multiple source database.

BACKGROUND TO THE INVENTION

The proliferation of data in the information age is only an advantage if the information delivered is accessible and reliable. As such, database technology has advanced considerably in recent years in an effort to keep pace with the exponential growth in the amount of data that must be handled.

An example of database use comes in the field of mobile telecommunications. Mobile devices are increasingly able to perform tasks above and beyond simple telephone calls or short message service (SMS) communications. There is now a bewildering array of mobile devices on the marketplace, each with its own unique set of capabilities. Content providers need to know what these capabilities are if they are to service the full range of devices correctly.

For example, a significant proportion of mobile devices are now able to access the world wide web. Web pages and other web resources may be specifically tailored for mobile devices, such as content coded using wireless markup language (WML) and accessible via wireless application protocol (WAP). However, mobile devices are increasingly capable of handling content generated for wider use (for instance, by personal computers), including content coded using hypertext markup language (HTML), extensible markup language (XML), and extensible hypertext markup language (XHTML).

Information about the capabilities of mobile devices is stored in a database which defines various characteristics of the device. This database will be referred to hereinafter as a "device database". The characteristics are represented by attributes which take a particular value in dependence on the device. For example, the display capabilities of a device depend on various characteristics, such as the pixel width of the device's screen. This width is described by an integer attribute which takes a specific value for a particular device.

Given the differing capabilities of mobile devices, it is not appropriate to deliver the same web content to all devices. As a result, rather than providing a web resource in exactly the same way to every mobile device that requests it, web servers increasingly adapt the content according to the attributes of the requesting device. To do this effectively, the web server must have easy access to a reliable device database.

For instance, a web server might use a device database to determine the requesting device's screen width and colour depth in order to adjust an image so that it fits and displays well on the device. Once a device is detected, the device database is queried to get the device attributes needed to adapt the web site's content to meet the needs and capabilities of the requesting device.

Clearly, to deliver properly formatted content, the device database needs to be accurate. An error in the database could result in a poor formatting decision which could in turn leave the consumer very dissatisfied and unwilling to return to the site. As of mid 2008, there were over 23,000 different makes and models of GSM handsets and it is therefore impractical for a web site developer to test their site against each device that might access it. As such, the quality of the device database used to deliver content is of the utmost importance.

To this end, a great deal of effort and investment has been put into the fabrication of accurate device databases. However, device databases still fall short of optimum accuracy and there remains a need for more reliable device databases.

In his book, "The Wisdom of Crowds: Why the Many Are Smarter Than the Few and How Collective Wisdom Shapes Business, Economies, Societies and Nations", James Surowiecki argued that aggregating information from a variety of members of a group can result in a decision which is superior to any that could have been made by a single member of group. A cited example is that of a crowd guessing the weight of an ox; the average result is remarkably accurate, and more accurate than the guess of any one individual, even if that individual is an expert.

This "crowdsourcing" technique is one of the principles behind the information technology movement known as "Web 2.0". Web 2.0 applications attempt to provide superior services and information by enabling the participation of all (or at least a number of) users. For example, the well-known reference website "Wikipedia.org" relies on the combined expertise of its users to produce an encyclopaedia covering topics that could not be covered by the initial proponents of the system alone.

In order to successfully apply crowdsourcing techniques to improve the accuracy of results, it has been proposed that four criteria must be met:
1. diversity of opinion;
2. independence of members from one another;
3. decentralisation; and
4. a good method for aggregating opinions.

The first three of these criteria relate essentially to the origin of the raw data; that is to the characteristics of the members of the crowd. The fourth, "a good method for aggregating opinions", relates to how that data is used to produce the desired result.

Returning to the example of device databases, it is to be recalled that a large number of attempts have been made to produce an adequate data set. This data has been collected in a broad variety of ways (fulfilling criterion 1), and has been undertaken by independent organisations with no central control (fulfilling criteria 2 and 3).

However, no conventional technique provides an adequate method of aggregating the data for this kind of database. A simple average of results for a given variable is undesirable, as it fails to distinguish between data obtained from a reliable source and that obtained from a less reliable source. Moreover, it is inappropriate for Boolean operators that simply take a "True" or "False" value (such as whether the device supports XTML).

SUMMARY OF INVENTION

According to a first aspect of the present invention, there is provided a method for estimating a probability of error of a value of a particular attribute in an aggregated database, the aggregated database being compiled from three or more source databases containing values for at least some of the same attributes as each other, the method comprising the steps of:

estimating a probability of error for each source database, the probability of error for a source database representing the chance that values of attributes in the database are incorrect; and estimating the probability of error of the value of the particular attribute in the aggregated database from the estimated probabilities of error for the source databases, wherein the step of estimating the probabilities of error for the source databases comprises:

determining numbers of conflicts between respective pairs of the source databases by, for each pair, comparing values of attributes in the pair of the source databases, the attributes of the pair whose values are compared being the same; and deriving the probability of error for the source databases from the numbers of conflicts.

The present invention provides significantly improved information when compared to conventional databases. The present invention uses a plurality of conventional databases as source databases to provide an aggregated database. Not only are the values stored in the aggregated database of superior accuracy to those in each individual source database, but the present invention also provides an estimate of this accuracy. Specifically, the present invention gives an estimate of the accuracy of a particular attribute in the aggregated database, rather than the accuracy of the database overall. This individual information allows a user to assess where the aggregated database's strengths and weaknesses lie, and, as a result, gives useful information as to how the aggregated database might be improved if this is required.

In order to provide the above benefits, the present invention uses the probabilities of error of each source database. Notably, these probabilities of error relate to the entirety of the source databases, not to specific attributes within them. As such, the present invention takes the generic information relating to the chance of error in attributes across entire source databases and turns it into specific information about a single attribute in the aggregated database.

The present invention estimates the probabilities of error for the source databases by analysing the rate of conflict between pairs of source databases. This provides information that allows the assessment of the probability of error of the value chosen for a particular attribute in the aggregated database.

Preferably, the aggregated database is compiled from four or more source databases, and the step of deriving the probability of error for the source databases comprises:

dividing the source databases into a plurality of triplets, each triplet consisting of three of the source databases;

determining triplet estimates of the probability of error for each source database from the number of conflicts between source databases in each triplet; and, averaging the triplet estimates of the probability of error to derive the probability of error for each source database.

The technique of providing separate triplet estimates based on the conflict between pairs within a number of triplets of source databases improves the estimate of the probability of error for the source databases. This is because it limits the effect of unusual or atypical levels of conflict between a pair of source databases.

In preferred embodiments, the step of estimating the probability of error of the value of the particular attribute in the aggregated database further comprises estimating the probabilities of error for each value of the particular attribute in the source databases from the estimated probabilities of error for the source databases. This allows comparison of the relative reliabilities of the values given by the source databases for the particular attribute. As such, a user is able to assess the relative reliability of the possible values for the particular attribute.

Preferably, the step of estimating the probabilities of error for each value of the particular attribute in the source databases is performed according to the pari-mutuel technique. The pari-mutuel technique provides an effective method of assessing the relative probability of a number of potential values for an attribute being correct.

In preferred embodiments, the value of the particular attribute in the aggregated database is chosen in dependence on the estimated probabilities of error for each value of the particular attribute in the source databases. In this manner, the value of the particular attribute in the aggregated database may be chosen appropriately to minimise its probability of error.

Preferably, the attributes are device properties. More preferably, the device is a mobile phone. In some embodiments, one or more of the attributes are Boolean.

Preferably, the method further comprises the step of providing the estimated probability of error of the particular attribute in the aggregated database to a user. This ensures a user has all available information when using information returned by the aggregated database.

It can also be appreciated that the invention can be implemented using computer program code. Indeed, according to a second aspect of the present invention, there is therefore provided computer software or computer program code adapted to carry out the method described above when processed by a processing means. The computer software or computer program code can be carried by a computer readable medium. The medium may be a physical storage medium such as a Read Only Memory (ROM) chip. Alternatively, it may be a disk such as a Digital Versatile Disk (DVD-ROM) or Compact Disk (CD-ROM). It could also be a signal such as an electronic signal over wires, an optical signal or a radio signal such as to a satellite or the like. The invention also extends to a processor running the software or code, e.g. a computer configured to carry out the method described above.

According to a third aspect of the present invention, there is provided an aggregation engine for compiling an aggregated database from three or more source databases containing values for at least some of the same attributes as each other, the aggregation engine being arranged to:

estimate a probability of error for each source database, the probability of error for a source database representing the chance that values of attributes in the database are incorrect; and estimate the probability of error of the value of the particular attribute in the aggregated database from the estimated probabilities of error for the source databases, wherein the aggregation engine is arranged to estimate the probabilities of error for the source databases by:

determining numbers of conflicts between respective pairs of the source databases by, for each pair, comparing values of attributes in the pair of the source databases, the attributes of the pair whose values are compared being the same; and deriving the probability of error for the source databases from the numbers of conflicts.

The apparatus preferably further comprises a device attribute store for storing the source databases and the aggregated database. More preferably, the apparatus further comprises a web server for delivering web content to a device in accordance with the values of the attributes in the aggregated database. In preferred embodiments, the device is a mobile device.

BRIEF DESCRIPTION OF THE DRAWINGS

Preferred embodiments of the present invention will now be described by way of example only with reference to the accompanying drawings, in which:

FIG. 4A illustrates the conflict ratios between ten source databases; and,

FIG. 4B illustrates the estimated probability of error for the ten source databases of FIG. 4A.

DETAILED DESCRIPTION OF PREFERRED EMBODIMENTS

Figure 1:
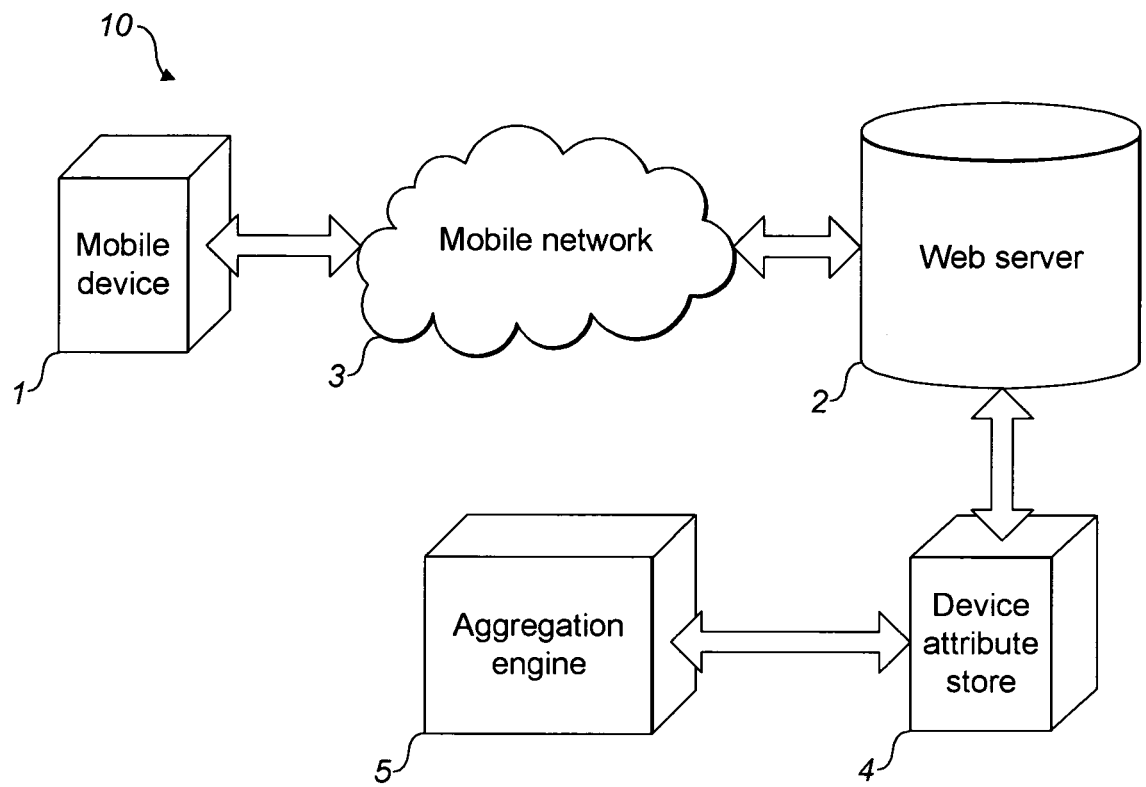
FIG. 1 shows a schematic illustration of an apparatus for carrying out the present invention.

Referring to FIG. 1, an apparatus 10 comprises a mobile device 1 that communicates with a web server 2 over a mobile network 3. In this example, the mobile device 1 is a mobile telephone, Personal Digital Assistant (PDA), or a Smartphone. However, in other examples, the mobile device 1 may be a satellite telephone or a personal computer. The mobile network 3 is in this example a terrestrial wireless communication network, such as a Global System for Mobile Communications (GSM) network, Code Division Multiple Access (CDMA) network, Universal Mobile Telecommunications System (UMTS) or Third Generation Wireless Format (3G) network. In other examples, the mobile network 3 is a satellite telecommunications network, the internet, a wired telecommunications network or such like.

The web server 2 hosts at least one web resource. Typically, the web resource comprises a web page coded in Extensible HyperText Markup Language (XHTML) according to the World Wide Web Consortium (W3C) Recommendation. Alternatively, the web resource may comprise a picture, sound or audiovisual file. The web server 2 is connected to a device attribute store 4. In this example, the device attribute store 4 is implemented as an Application Programming Interface (API) running on the same computer system as the web server 2. However, in other examples, the device attribute store 4 is implemented on a separate computer system and the web server 2 communicates with the device attribute store 4 over a network.

The mobile device 1 is one of many different types generally available. The characteristics of these different devices will vary, affecting their capabilities. Each characteristic of a device is defined by an attribute, and the value of these attributes for each device may be different. It will be understood that a value of an attribute is not limited to being a number, but can be a character or Boolean value for example. A database containing the values of attributes for a number of devices is known as a device database.

In the present invention, an aggregation engine 5 is provided to compile an aggregated device database from a number of source device databases. The source device databases may be produced in a variety of alternative ways, as described later. Both the source device databases and the aggregated database are stored in the device attribute store 4.

The aggregation engine 5 receives source device databases from the device attribute store 4 and uses these to create the aggregated device database, which is then also stored in the device attribute store 4. In addition to storing values for each attribute, the aggregated device database also includes information regarding the probability of each attribute being correct. The aggregated database is more accurate than any given source database, and the provision of a probability of error for each value allows easy identification of attributes that require further research.

The aggregation engine 5 assesses conflicts between source databases to establish the probability of error for each source database. It then uses these to compile the aggregated database and to estimate the probability of the value of each attribute in the aggregated database. The means by which these steps are achieved, and the advantages that arise as a consequence, are discussed in greater detail below.

When a user of the mobile device 1 attempts to access the web resource, the web server 2 looks up the values of the device attributes in the aggregated device database before returning data to the mobile device 1 that is appropriate for its capabilities.

Figure 2:
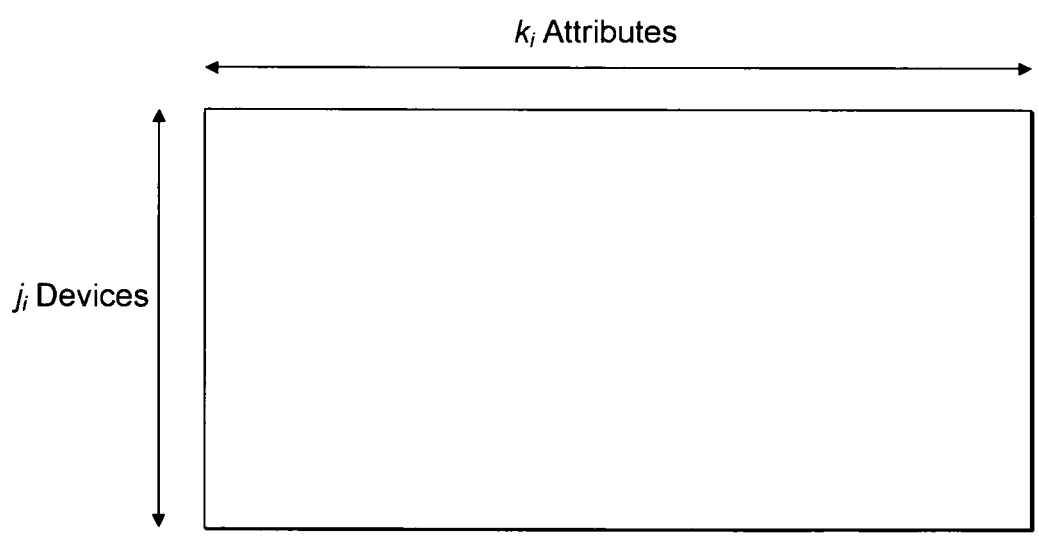
FIG. 2 shows a device database.

In order to understand how the aggregation engine 5 is able to create the aggregated device database from the source device databases, it is important to consider the nature of device databases in general. A device database may be considered as a table of cells with a number of rows representing different devices and a number of columns representing different attributes. Each cell therefore represents the value of particular attribute for a particular device. A given device database, S, will contain $j_i$ devices in rows and $k_i$ devices in columns, as illustrated in FIG. 2.

Each value stored in a cell will take the appropriate data type for the attribute stored in that cell. For example, if an attribute describes a characteristic of the device that is either true or false, such as "Is J2ME supported?", then the data type will be Boolean. Alternatively, an attribute may describe a characteristic of the device which may take a range of integer values, such as "What is the pixel width of the screen?", and in this case the data type will be integer. One skilled in the art will recognise that other data types may be appropriate for other kinds of attribute, and these are adopted in the device database as required.

The quality of the device database is defined by the accuracy and reliability of the facts stored within it. That is, the quality of the device database depends on how many of the values stored correctly represent the true attributes of the device. Regardless of the data type, each value is ultimately either correct or incorrect.

The error in a particular device database may be considered under two categories: systematic error and random error. Systematic error represents the inherent unreliability of the values making up the database; for example, it may arise due to imperfect measurement techniques. In contrast, random error may occur in any database at any point, due either to a freak measurement result or, more typically, due to a typographical error during the entry of the value in the database.

In general, a given device database, S, will have a probability of error Pe which represents the likelihood that a given value will be incorrect. The Pe for a device database will depend in large part upon the techniques used to fabricate the device database. For example, a device database may be built from:

Design Data—this typically comes from the manufacturer of the device and will be based on the functional specification. These databases are built within insight into the design itself and the probability of error, $Pe_{Design\ Data}$, is low.

Test Data—many different organisations test the attributes of devices for various purposes. For example: manufacturers will test devices to see if the functional specification is correct; network operators test devices to see if they fulfil the requirements of the network and its customers; and third-parties test devices either because they are contracted to or for their own purposes. In general, significant efforts are employed to provide reliable test apparatuses, and the probability of error, $Pe_{Test\ Data}$, for values obtained in this way is extremely low.

Informed Guess—experts in the field of the particular device type are typically able to review the available material regarding a device and make an informed guess as to its capabilities. Typically, these reviews are carried out for the trade or consumer press, and involve using of the device for a period of time and inspecting the available literature. Values obtained in this way typically have a moderate probability of error, $Pe_{Informed\ Guess}$.

Guess—a simple guess at the correct value for a given attribute of a device is unlikely to produce the correct answer, and will have a high probability of error $Pe_{Guess}$.

It is clear therefore that the probability of error in device databases may vary widely. In the examples given above, it is likely that $Pe_{Test\ Data} < Pe_{Design\ Data} < Pe_{Informed\ Guess} < Pe_{Guess}$.

For the sake of simplicity in this analysis, it is assumed that the probability of error, Pe; for each device database is constant across all of the attributes in the device database. However, one skilled in the art will recognise that the following discussion applies equally when the probability of error varies by one or both of the attribute and the device.

A uniform $Pe_i$ for device database $S_i$ will provide valuable information about the accuracy of the device database. In particular, the expected total number of errors in the device database can be calculated as $j_i k_i Pe_i$, where there are $j_i$ devices and $k_i$ attributes in the device database. However, this information does not locate these errors in the device database.

As mentioned previously, the present invention employs an aggregated device database built from a number of source device databases. For conciseness, these are referred to hereinafter as aggregated databases and source databases respectively.

Consider an aggregated database built by the aggregation engine from information in a number of separate source databases, each having their own probability of error. In this system, the aggregated database has n sources of device data, each represented by a source database $S_i$ where i is the serial number of the source database and runs from 1 to n. Each source database, $S_i$, comprises values of $j_i$ devices for $k_i$ attributes. These source databases may be considered in the same way as the device database described with reference to FIG. 2.

For simplicity, the following analysis makes a number of assumptions about the sources and the data contained therein. However, one skilled in the art will recognise that the principles of the present invention can be extended to circumstances in which these assumptions do not apply.

Firstly, it is assumed that the values in each source database are independent. That is, the data in each source database is assumed to be derived separately. It is also assumed that all source databases overlap completely. That is to say, each source database contains information for the same combinations of device and attribute, and no source database lacks a value for any of these. Finally, it is assumed that all attributes are Boolean, taking a value of either true or false. Accordingly, if a given value is incorrect in both databases then they will agree; this is not necessarily the case when an attribute may take a range of values.

If each source database, $S_i$, has a probability of error, $Pe_i$, associated with it, then any given cell in the source database will either be the correct and accurate value for that device with a probability of $1-Pe_i$, or it will be an error with probability of $Pe_i$. The aggregated database is built from multiple source databases by merging common attributes for the same devices and recording any conflict for the different sources. Therefore a cell in the aggregated database can be viewed as having the following states:

1. DE (Detected Error)—the two source databases disagree as to the value of the cell and there is a conflict. As the attributes are Boolean, one of the source databases must be right while the other is wrong.
2. OK—the two sources agree (that is, no conflict between the values in the source databases is detected) and both are correct.
3. UE (Undetected Error)—the two sources agree (that is, no conflict between the values in the source databases is detected) but both are wrong.

Because the aggregation engine compares data from different sources in order to build the aggregated database, additional insight into data quality of the database is provided that is not available in the case of a single source database. Firstly, the presence of a conflict between the source databases indicates that one of the source databases is incorrect. This is a Detected Error (DE). A DE can be used as a signal that additional testing should be done to determine the true and correct value for the attribute. Moreover, a DE can be used to gain insight into the overall quality of the input source databases (that is, their $Pe_i$); this aspect is discussed in further detail below.

Additionally, merging a plurality of source databases reduces the chance of an Undetected Error (UE). This is because both source databases must return incorrect values for the same attribute and same device. The chances of errors overlapping in this way is small.

In general, the probability of each of the above outcomes in an aggregated database can be calculated when there are n source databases each with a probability of error, $Pe_i$, as:

$$P(UE) = \prod_{i=1}^{n} Pe_i$$

$$P(OK) = \prod_{i=1}^{n} (1 - Pe_i)$$

$$P(DE) = 1 - P(UE) - P(OK)$$

If an aggregated database is merged from n source databases each containing $j_i$ devices and $k_i$ attributes, the expected number of each cell type will be as follows:

$$E(UE) = P(UE) j_i k_i$$

$$E(OK) = P(OK) j_i k_i$$

$$E(DE) = P(DE) j_i k_i$$

In order to illustrate the principles of an aggregated database in practice, consider an aggregated database built from three source databases that contain 100 common attributes, $k_1 = k_2 = k_3 = 100$, from 100 common devices, $j_1 = j_2 = j_3 = 100$. Moreover, assume the first source database, $S_1$, has a $Pe_1 = 0.01$, the second source database, $S_2$, has a $Pe_2 = 0.05$ and the third source database, $S_3$, has a $Pe_3 = 0.1$. As such, the expected number of each cell type is:

$$E(UE) = 0.01 * 0.05 * 0.1 * 10,000 = 0.5$$

$$E(OK) = 0.99 * 0.95 * 0.9 * 10,000 = 8,464.5$$

$$E(DE) = (1 - 0.84645 - 0.00005) * 10,000 = 1,535$$

By combining the three source databases a considerable amount of further insight into the quality of the data is provided. Clearly, it is possible to identify the location of the detected errors because these are the cells in which there is a conflict between the sources. On the other hand, where there is no conflict between the cells it is known that this is either an undetected error or they are both correct. Moreover, the probability of such as non-conflicting cell being an undetected error can be calculated as 0.5/(8464.5+0.5)=0.00006. As such, the reliability of such a cell is significantly greater than any cell in either source database.

Figures 3A, 3B:
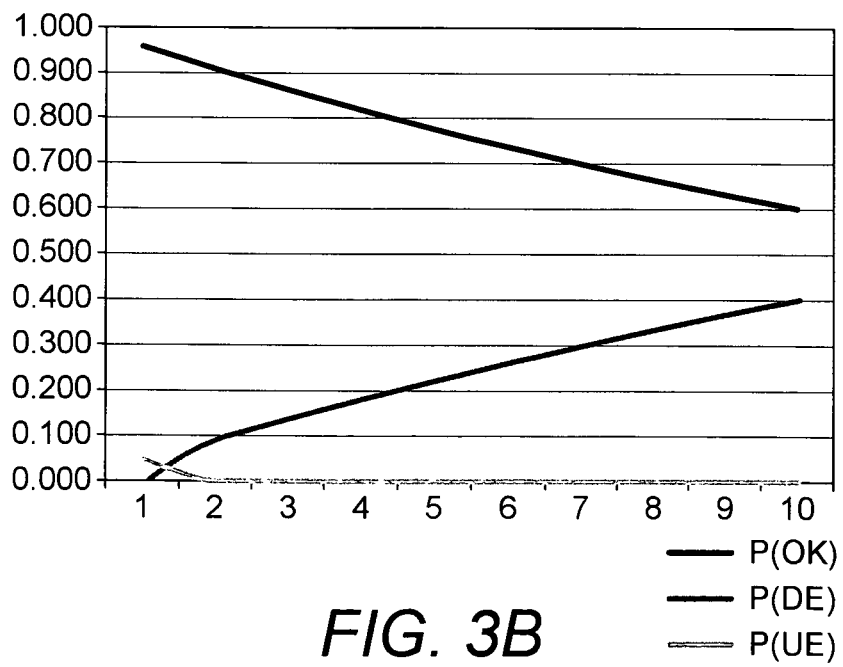
FIG. 3 illustrates the effect of the number of source databases upon the probability that a given cell in an aggregated database will be in conflict.

FIG. 3 illustrates the progression of P(OK), P(DE), and P(UE) as the number of source databases increases. FIG. 3A is a table of the raw calculations while FIG. 3B shows a graphic representation of the progression. As can be seen from FIGS. 3A and 3B, an increasing number of sources leads to a diminishing P(UE), which is highly desirable. However, it is also clear that P(OK) diminishes, due to a drop in the number of those cells without conflict. This is reflected by increasing P(DE), as the probability of cells conflicting increases with more source databases.

The expected number of cells in each state is the probability of that state as illustrated in FIG. 3 multiplied by the numbers of cells shared by the source databases.

An increase in the number of source databases drastically reduces the probability of error in those cells in which no conflict is identified, but does not in itself help identify which of the returned values for a cell in conflict should be chosen. However, if the Pe of each source database is known then this may be used to ensure the best choice is made.

In order to calculate the Pe of each source database, the present invention analyses the rate of detected errors that occur between pairs of source databases within a larger set. This provides a number of simultaneous equations that may be solved to establish the Pe values for each source database. For example, consider a number of source databases, $S_i$ for i=1 to n, these will give a series of simultaneous, non-linear equations as follows:

$$P(DE) = \frac{E(DE)_{a,b}}{jk_{a,b}} = 1 - P(OK) - P(UE)$$

$$\frac{E(DE)_{a,b}}{jk_{a,b}} = Pe_a + Pe_b - 2Pe_aPe_b \text{ and}$$

$$0 \le Pe_i \le \min_{i=1}^{n} Pe_{il}$$

Where $E(DE)_{a,b}$ is the number of conflicts between $S_a$ and $S_b$, and $jk_{a,b}$ are the number of common attributes between $S_a$ and $S_b$.

There are n!/2(n−2)! pairs of source databases and accompanying simultaneous equations to discover each of the $Pe_i$ values. When n≥3, the number of equations will be greater than or equal to n and there is thus enough information to calculate the n $Pe_i$ values in the system.

In order to illustrate this, consider the simplest example of n=3. Three source databases $S_1$, $S_2$, and $S_3$ have probabilities of error $Pe_1$, $Pe_2$ and $Pe_3$. These source databases include values for k attributes of j devices. On merging these source databases in pair combinations, three aggregated databases $M_{1,2}$, $M_{1,3}$, and $M_{2,3}$ are produced. Each of these have an observable conflict ratio $C_{1,2}$, $C_{1,3}$, and $C_{2,3}$ where $C_{a,b}$ is defined as the rate of observed detected errors $DE_{a,b}$ in the merged database as follows:

$$C_{a,b} = \frac{DE_{a,b}}{jk_{a,b}}$$

Because:

$$C_{a,b} = Pe_a + Pe_b - 2Pe_aPe_b$$

We end up with a system of non-linear equations as follows:

$$C_{1,2} = Pe_1 + Pe_2 - 2Pe_1Pe_2$$

$$C_{1,3} = Pe_1 + Pe_3 - 2Pe_1Pe_3$$

$$C_{2,3} = Pe_2 + Pe_3 - 2Pe_2Pe_3$$

Where $0 < Pe_i < \text{Max}(C_{a,b})$.

Rearranging the first two equations to isolate $Pe_1$ gives:

$$Pe_1 = \frac{C_{1,2} - Pe_2}{1 - 2Pe_2}$$

$$Pe_1 = \frac{C_{1,3} - Pe_3}{1 - 2Pe_3}$$

As these are equal:

$$\frac{C_{1,2} - Pe_2}{1 - 2Pe_2} = \frac{C_{1,3} - Pe_3}{1 - 2Pe_3}$$

Isolating $Pe_2$:

$$Pe_2 = Pe_3 \left(\frac{2C_{1,2} - 1}{2C_{1,3} - 1}\right) + \left(\frac{C_{1,3} - C_{1,2}}{2C_{1,3} - 1}\right)$$

This expression is then substituted into the equation for $C_{2,3}$ above:

$$C_{2,3} = Pe_3 \left(\frac{2C_{1,2} - 1}{2C_{1,3} - 1}\right) + \left(\frac{C_{1,3} - C_{1,2}}{2C_{1,3} - 1}\right) + Pe_3 - 2Pe_3 \left(Pe_3 \left(\frac{2C_{1,2} - 1}{2C_{1,3} - 1}\right) + \left(\frac{C_{1,3} - C_{1,2}}{2C_{1,3} - 1}\right)\right)$$

This gives a quadratic equation for $Pe_3$ of the form $0 = aPe_3^2 + bPe_3 + c$, where:

$$a = \frac{4C_{1,2} - 2}{2C_{1,3} - 1}$$

$$b = \frac{2 - 4C_{1,2}}{2C_{1,3} - 1} = -a$$

$$c = C_{2,3} - \left(\frac{C_{1,3} - C_{1,2}}{2C_{1,3} - 1}\right)$$

$Pe_3$ can therefore be calculated from the quadratic formula:

$$Pe_3 = \frac{a \pm \sqrt{a^2 - 4ac}}{2a}.$$

The above equations can, therefore, be used to calculate the Pe for each source database from the observed rate of conflict $C_{a,b}$ between each pair of source databases.

To demonstrate the efficacy of this methodology, consider the three source databases to have error rates of $Pe_1=0.01$, $Pe_2=0.05$, and $Pe_3=0.10$. For any arbitrary number of attributes, the resulting set conflict ratios between pairs of source databases, $C_{a,b}$ will be: $C_{1,2}=0.059$, $C_{1,3}=0.108$ and $C_{2,3}=0.140$ Entering these conflict ratios into the equation above for $Pe_3$ returns a value of either 0.9 or 0.1. However, it is also known that $0<Pe_i<Max\,(C_{a,b})$, and therefore the value of 0.9 can be discarded, leaving a calculated $Pe_3$ of 0.1. This is the correct value, and can be used to calculate $Pe_2$ and $Pe_1$ as 0.05 and 0.01 respectively, and these are also correct.

The above example gives the exact values of the Pe for each source database. This is a result of the fact that the observed conflict ratios follow the expected rate of detected errors exactly. However, in practice the observed conflict ratio is a random variable distributed around a mean. As such, calculating Pe from the observed conflict ratio will not always give a sufficiently accurate answer, and in some cases may give an answer far enough from the true value as to be misleading.

In order to address this inaccuracy, a number of estimated Pe values for each source database can be calculated by analysing different triplets within the set of source databases. For example, if there are four source databases $S_1$, $S_2$, $S_3$ and $S_4$ then the $Pe_1$ in $S_1$ can be calculated by analysing the conflict in the following triplets: $S_1$, $S_2$, and $S_3$; $S_1$, $S_2$, and $S_4$; and $S_1$, $S_3$, and $S_4$. This will give three different values for $Pe_1$, which can then be averaged to provide a best guess of the true value.

In general, for n source databases there are $n!/(6*(n-3)!)$ unique triplets of databases, and from the conflict ratios between pairs of source databases in each triplet the values of the Pe for each source database can be estimated. As such, each of the collection of triplets will result in a set of estimated Pe values for each of the source databases in that triplet. Accordingly, there are $n!/(2*(n-3)!)$ estimated values for each $Pe_i$.

As mentioned previously, the various estimated $Pe_i$ may be averaged to produce a superior estimate. It is envisaged that during calculation of the average $Pe_i$ it may be preferable to discard outliers in the initial results. For example, if a calculated $Pe_i$ is less than zero or greater than one this value may be ignored in calculating the average $Pe_i$. Alternatively, the calculated $Pe_i$ may be manipulated prior to calculating the average such that they do not exceed reasonable margins (for example, limiting the range to between zero and one). For example, a calculated $Pe_i$ less than zero may be replaced with a value of zero in the calculation of the average.

FIGS. 4A and 4B show results from a real world example in which the conflict ratios between a set of ten source databases were used to calculate their probabilities of error. The ten source databases result in 44 database pairs (there would be 45, but two of the source databases contain no overlapping data). From these 10 source databases, 120 different triplets can be formed to gather a set of calculated probabilities of error, Pe from the sources. These are then averaged to provide a set of estimated Pe to use for presenting data from the aggregated database.

The conflict ratios, $C_{i,j}$, between the source databases (labelled 1 to 10) are illustrated in FIG. 4A. No conflict ratio can be calculated for $C_{3,10}$ because there is no overlapping data between these two source databases.

As described above, these conflict ratios can be used to estimate the probability of error, Pe, of each source database.

FIG. 4B shows the estimated Pe for each source database, and also assigns each source database a rank in dependence on the estimated Pe.

The results of the process illustrated in FIGS. 4A and 4B are consistent with an intuitive understanding of the probability of error for the source databases. In particular, the source databases were constructed by various techniques: source databases 2, 6, 8, and 9 are informed guesses; source databases 1, 3, and 10 are design specifications from manufacturers; and source databases 4, 5, and 7 are the result of structured testing methodologies using live handsets. The results shown in FIG. 4B illustrate that $Pe_{Test\,Data} < Pe_{Design\,Data} \geq Pe_{Informed\,Guess}$, as expected.

Although the above solution advocates an analytic solution of the equations describing the system, these could alternatively be solved through computational methods such as any of the Newton techniques or any of the following:

Trust—region method;
Broyden method;
Secant method;
Halley method; and
Grosan—Abraham method.

The Pe values allow and aggregated database to return the value from the source databases that is most likely to be correct. Moreover, they allow a calculation of the probability that each value is correct.

Where all the source databases agree on a value the aggregated database will return that value to the user. Moreover, it is known that the probability that this value is correct will equal $P(OK)/(P(OK)+P(UE))$.

Where there is disagreement between the source databases as to a particular value, a decision must be made as to which source database value is considered the most likely to be correct. It is also beneficial to be able to provide a probability that the chosen value is correct.

A preferred technique for taking these decisions is based on the pari-mutuel model often used in betting or gambling, particularly on horses. This model gives the probability or odds on a given outcome in dependence on the weight of the betting on that outcome. To apply it to the present case, each source database is considered to 'bet' on the value it holds being correct, and the weight of these wagers is directly proportional to the probability that the value in that source database is correct (i.e. directly proportional to (1−Pe)). As multiple sources may agree on a single value the weight of wagers for a single value may add up cumulatively, biasing the odds in favour of values on which multiple source databases having low Pes agree.

Consider the possible values of a given attribute in a system of n source databases to be represented by $V_1$ to $V_x$ where x is less than or equal to n+1. This includes up to n unique values of the attribute provided by the source databases and an additional value representing the case when all source databases are wrong.

A special case occurs when the attribute is Boolean. Under these circumstances, only two values of $V_i$ are possible.

For a given value $V_i$ returned by at least one source database, the wager is equal to the sum of (1−Pe) for every source database that returns that value. The value of the wager for $V_i$ is the product of the Pe for all the source databases as it is related to the chance that all source databases are in error. The wager pool, or total wager, is represented by $W_T$ and is the sum of each wager from $W_i$ to $W_x$.

Given the above, the decimal odds that any particular $V_i$ is correct equals $W_T/W_i$, while the probability of this value being correct is the reciprocal of this number.

In order to illustrate the application of this process, consider again the above-mentioned example in which three source databases $S_1$, $S_2$ and $S_3$ have $Pe_1=0.01$, $Pe_2=0.05$ and $Pe_3=0.1$ respectively. The source databases share 100 common attributes, $k_1=k_2=k_3=100$, from 100 common devices, $j_1=j_2=j_3=100$. Note that the attributes are no longer assumed to be Boolean.

Now assume that for a given attribute $S_1$ and $S_3$ return a value a, while $S_2$ returns b. As such, there are three possible outcomes or $V_i$; $V_1=a$, $V_2=b$, and $V_3=$not(a or b). The wagers, $W_i$, for these are as follows:

$$W_1 = (1-Pe_1) + (1-Pe_3) = 0.99 + 0.90 = 1.89$$

$$W_2 = (1-Pe_2) = 0.95$$

$$W_3 = Pe_1 * Pe_2 * Pe_3 = 0.00005$$

$$W_T = W_1 + W_2 + W_3 = 1.89 + 0.95 + 0.00005 = 2.840005$$

Thus, the decimal odds for $V_1$ are 1.50267, the decimal odds for $V_2$ are 2.98953, and the decimal odds for $V_3$ are 56801. This equates to a probability of each of these values being correct as follows:

$$P(V_1) = \frac{1.89}{2.84005} = 0.66548$$

$$P(V_2) = \frac{0.95}{2.84005} = 0.33450$$

$$P(V_3) = \frac{0.00005}{2.84005} = 0.00002$$

As such, the aggregated database will return $V_1$ (which is a) as it has the largest probability that it will be correct. Specifically, a has a 66.548% probability of being correct. The aggregated database is thus able not only to return the most likely value, but also to provide information regarding the reliability of this information.

In general, using the above technique, if a subset of source databases $S_j$ from $j=0$ to $j=m$ agree on a value $V_z$, then the probability that $V_z$ is correct will be:

$$P(V_Z) = \frac{\sum_{j=0}^{m}(1-Pe_j)}{\left(\prod_{i=0}^{n} Pe_i + \sum_{i=0}^{n}(1-Pe_i)\right)}$$

If the above technique does not provide a clear result as to the most probable of the values given by the source databases (for example, if the probability of two values is substantially similar), then the aggregated database may request further information (further sources) regarding that particular attribute. In this way, attributes about which further research is required may be identified.

Other variations and modifications will be apparent to the skilled person. Such variations and modifications may involve equivalent and other features which are already known and which may be used instead of, or in addition to, features described herein. Features that are described in the context of separate embodiments may be provided in combination in a single embodiment. Conversely, features which are described in the context of a single embodiment may also be provided separately or in any suitable sub-combination.

It should be noted that the term "comprising" does not exclude other elements or steps, the term "a" or "an" does not exclude a plurality, a single feature may fulfil the functions of several features recited in the claims and reference signs in the claims shall not be construed as limiting the scope of the claims. It should also be noted that the Figures are not necessarily to scale; emphasis instead generally being placed upon illustrating the principles of the present invention.

The invention claimed is:

1. A method for estimating a probability of error of a value of a particular attribute in an aggregated database, the aggregated database being compiled from three or more source databases containing values for at least some of the same attributes as each other, the method comprising the steps of:
   estimating a probability of error for each source database, the probability of error for a source database representing the chance that values of attributes in the database are incorrect;
   estimating the probability of error of the value of the particular attribute in the aggregated database from the estimated probabilities of error for the source databases, wherein the step of estimating the probabilities of error for the source databases comprises:
      determining numbers of conflicts between respective pairs of the source databases by, for each pair, comparing values of attributes in the pair of the source databases, the attributes of the pair whose values are compared being the same; and
      deriving the probability of error for the source databases from the numbers of conflicts; and
   wherein the step of estimating the probability of error of the value of the particular attribute in the aggregated database comprises:
      estimating the probabilities of error for each value of the particular attribute in the source databases from the estimated probabilities of error for the source databases.

2. A method according to claim 1, wherein the aggregated database is compiled from four or more source databases, and wherein the step of deriving the probability of error for the source databases comprises:
   dividing the source databases into a plurality of triplets, each triplet consisting of three of the source databases;
   determining triplet estimates of the probability of error for each source database from the number of conflicts between source databases in each triplet; and,
   averaging the triplet estimates of the probability of error to derive the probability of error for each source database.

3. A method according to claim 1, wherein the step of estimating the probabilities of error for each value of the particular attribute in the source databases is performed according to the pari-mutuel technique.

4. A method according to claim 1, wherein the value of the particular attribute in the aggregated database is chosen in dependence on the estimated probabilities of error for each value of the particular attribute in the source databases.

5. A method according to claim 1, further comprising requesting further information regarding the particular attribute if the estimated probability of error of the value of the particular attribute in the aggregated database is above a threshold value.

6. A method according to claim 1, wherein the attributes are device properties.

7. A method according to claim 5, wherein the device is a mobile phone.

8. A method according to claim 1, wherein one or more of the attributes are Boolean.

9. A method according to claim 1, further comprising the step of providing the estimated probability of error of the particular attribute in the aggregated database to a user.

10. A computer program product comprising a computer program stored on a non-transitory computer readable medium, the computer program product comprising computer executable instructions for carrying out the method of claim 1.

11. An apparatus employed on a non-transitory computer-readable medium for estimating a probability of error of a value of a particular attribute in an aggregated database, the apparatus comprising an aggregation engine for compiling an aggregated database from three or more source databases containing values for at least some of the same attributes as each other, the aggregation engine being arranged to:
   estimate a probability of error for each source database, the probability of error for a source database representing the chance that values of attributes in the database are incorrect;
   estimate the probability of error of the value of the particular attribute in the aggregated database from the estimated probabilities of error for the source databases, wherein the aggregation engine is arranged to estimate the probabilities of error for the source databases by:
      determining numbers of conflicts between respective pairs of the source databases by, for each pair, comparing values of attributes in the pair of the source databases, the attributes of the pair whose values are compared being the same; and
      deriving the probability of error for the source databases from the numbers of conflicts; and
   wherein the aggregation engine is arranged to estimate the probability of error of the value of the particular attribute in the aggregated database by:
      estimating the probabilities of error for each value of the particular attribute in the source databases from the estimated probabilities of error for the source databases.

12. An apparatus according to claim 11, further comprising a device attribute store for storing the source databases and the aggregated database.

13. An apparatus according to claim 11, further comprising a web server for delivering web content to a device in accordance with the values of the attributes in the aggregated database.

14. An apparatus according to claim 13, wherein the device is a mobile device.

15. A method for estimating a probability of error of a value of a particular attribute in an aggregated database, the method comprising:
   providing three or more source databases containing values for at least some of the same attributes as each other;
   compiling the aggregated database from the three or more source databases;
   estimating a probability of error for each of the source databases, the probability of error for the source database representing the chance that values of attributes in the source database are incorrect;
   estimating the probability of error for each value of the particular attribute in the source databases from the estimated probabilities of error of the source databases; and
   choosing the value of the particular attribute in the aggregated database in dependence on the estimated probabilities of error for each value of the particular attribute in the source databases;
   estimating the probability of error of the value of the particular attribute in the aggregated database from the estimated probabilities of error for the source databases; and
   wherein the step of estimating the probabilities of error for each of the source databases comprises:
      determining numbers of conflicts between respective pairs of the source databases by, for each pair, comparing values of attributes in the pair of the source databases, the attributes of the pair whose values are compared being the same; and
      deriving the probability of error for each of the source databases from the numbers of conflicts.

16. A method for estimating a probability of error of a selected value of a particular attribute in an aggregated database, the method comprising:
   providing a first source database containing at least a first value associated with the particular attribute;
   providing a second source database containing at least a second value associated with the particular attribute;
   providing a third source database containing at least a third value associated with the particular attribute;
   compiling the aggregated database from the first source database, the second source database and the third source database by selecting the first value, the second value or the third value as the selected value of the particular attribute;
   estimating a first source probability of error for the first source database, a second source probability of error for the second source database and a third source probability of error for the third source database, the first source probability of error, second source probability of error, and third source probability of error representing the chance that values of attributes in the first source database, the second source database and the third source database are incorrect;
   wherein estimating the first source probability of error, the second source probability of error, and the third source probability of error comprises:
      determining a first number of conflicts between the first source database and the second source database;
      determining a second number of conflicts between the first source database and the third source database;
      determining a third number of conflicts between the second source database and the third source database; and
      deriving the first source probability of error, second source probability of error and third source probability of error from the first number of conflicts, the second number of conflicts and the third number of conflicts; and
   estimating the probability of error of the selected value of the particular attribute in the aggregated database from the first source probability error, the second source probability of error and the third source probability of error.

* * * * *